United States Patent [19]

Gethmann et al.

[11] Patent Number: 5,180,139

[45] Date of Patent: Jan. 19, 1993

[54] ROTARY BALL FLUID CONTROL VALVE WITH NOISE ATTENUATOR

[75] Inventors: Douglas P. Gethmann, Gladbrook; Allen C. Fagerlund, Marshalltown, both of Iowa

[73] Assignee: Fisher Controls International, Inc., Clayton, Mo.

[21] Appl. No.: 775,615

[22] Filed: Oct. 15, 1991

[51] Int. Cl.$^5$ ............... F16K 47/02; F16K 47/04
[52] U.S. Cl. .................. 251/127; 137/625.32; 251/207
[58] Field of Search ........... 251/127, 209, 207; 137/625.32

[56] References Cited

U.S. PATENT DOCUMENTS

| | | |
|---|---|---|
| 1,615,564 | 1/1927 | Beery . |
| 3,023,783 | 3/1962 | Vickery . |
| 3,665,965 | 5/1972 | Baumann . |
| 3,826,281 | 7/1974 | Clark . |
| 3,880,191 | 4/1975 | Baumann . |
| 4,085,774 | 4/1978 | Baumann . |
| 4,212,321 | 7/1980 | Hulsey . |
| 4,271,866 | 6/1981 | Bey . |
| 4,295,493 | 10/1981 | Bey . |
| 4,364,415 | 12/1982 | Polon . |
| 4,402,485 | 9/1983 | Fagerlund . |
| 4,479,510 | 10/1984 | Bey . |
| 4,530,375 | 7/1985 | Bey . |
| 4,610,273 | 9/1986 | Bey . |
| 4,691,894 | 9/1987 | Pyotsia et al. . |

FOREIGN PATENT DOCUMENTS

| | | |
|---|---|---|
| 0325846A1 | 8/1989 | European Pat. Off. . |
| 1200688 | 9/1965 | Fed. Rep. of Germany . |
| 2352370A1 | 4/1975 | Fed. Rep. of Germany . |
| 2446025A1 | 4/1975 | Fed. Rep. of Germany . |
| 2359717A1 | 6/1975 | Fed. Rep. of Germany . |
| 7314151 | 4/1975 | Netherlands . |
| 237241 | 4/1945 | Switzerland . |
| 552453 | 5/1977 | U.S.S.R. . |

OTHER PUBLICATIONS

"Soundtrim Modulating Low Noise Control Plug Valve", *Durco Brochure Bulletin V-37*, Jun. 1987.
*NAF-Trimball* (undated).
"Series 61 and 62 High Performance Rotary Valve", *Introl*, undated.
"Anticavitation Rotary Control Valve, Rotrol-Series 61", *InTech*, Sep. 1987.
*Neles Q-Ball* ®, "Trim Alternatives", May 1986.
Neles, "Control Valves for Gas Transmission and Distribution", Application Data Sheet 5B1, Oct. 1986.
Neles, "Control Valves Series R11 and Q-R11", Jan., 1988.
Neles-Jamesbury, "Q-Ball ® Quiet Metal Seated Rotary Control Valve", Mar. 1989.
Neles, "Q-Ball ® Valve Applications for Power Plants", Application Data Sheet-7B1, undated.

*Primary Examiner*—Arnold Rosenthal
*Attorney, Agent, or Firm*—Marshall, O'Toole, Gerstein, Murray & Bicknell

[57] ABSTRACT

A rotary ball for a fluid control valve controlling a fluid stream with a spherical ball control member and a spherically shaped dome containing a plurality of apertures at the ball inlet bore end. The fluid stream is dissipated and broken up into smaller streams by being forced through the apertured dome. One or more apertured discs can be mounted in the bore to obtain the desired valve capacity and noise attenuation. A domed apertured plate may also be used at the bore outlet end. Substantially constant noise attenuation is obtained over the full travel of the valve from the initial open position to the fully opened position.

5 Claims, 2 Drawing Sheets

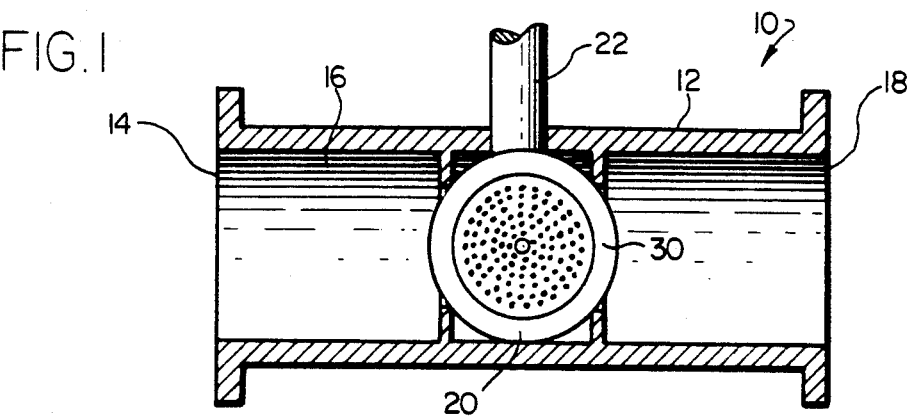
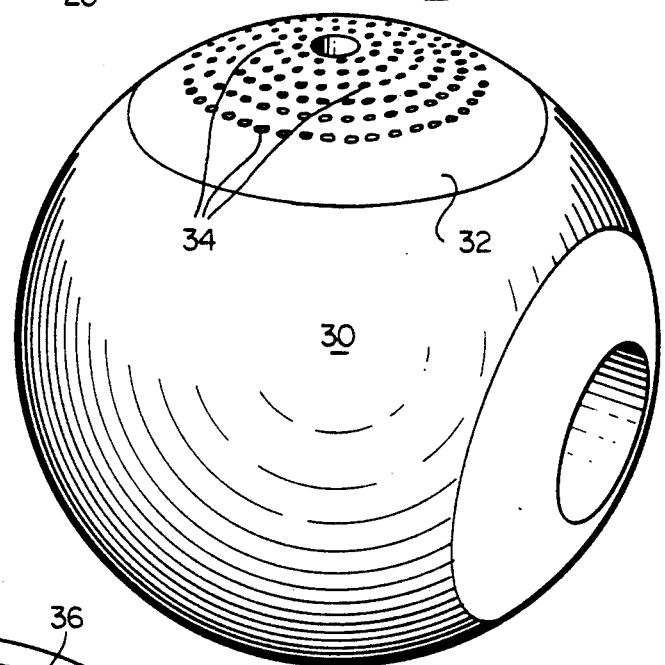
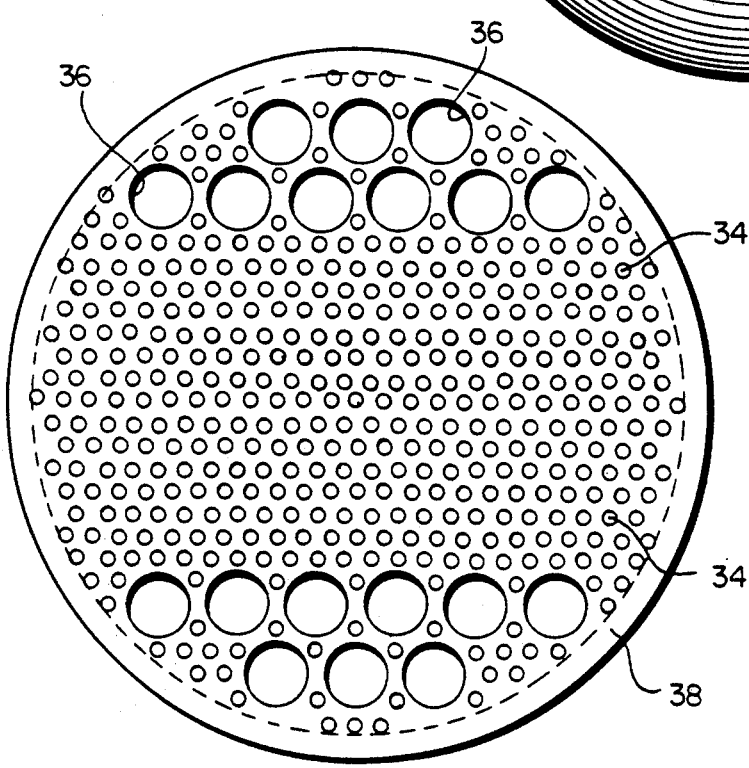

ROTARY BALL FLUID CONTROL VALVE WITH NOISE ATTENUATOR

This invention relates to fluid control valves and in particular to full ball rotary control valves having a noise attenuator device contained therein.

BACKGROUND OF THE INVENTION

It is desired to provide full ball rotary control valves for fluid control systems wherein means are provided for reducing both the aerodynamic and hydrodynamic noise within the system. It is especially desired to provide such noise attenuating means movable with the rotary ball control member so as to reduce the construction costs as well as the maintenance costs for such units.

Several combined full ball/attenuator units incorporate noise attenuator devices mounted within the ball bore such that full noise attenuation is obtained upon initial valve opening; a substantial reduction in attenuation is obtained as the valve is continued and zero attenuation is obtained when the valve is fully opened. In the fully opened valve position the flow stream is substantially unimpeded by the noise attenuator devices. Such units are desired where the control valve must handle a high capacity of fluid flow.

In certain applications a high capacity flow handling control valve is not needed. Also, it is desired in certain applications that the amount of noise attenuation should be fairly constant with respect to the control valve position, and in particular it may be desired to have almost full noise attenuation at the full-travel or fully opened valve position.

SUMMARY OF THE INVENTION

A rotary ball for a fluid control valve includes a spherical ball control member with an elongated single bore which receives fluid at an inlet bore end and communicates the fluid to an outlet bore end. A spherically shaped dome member is mounted at the end of the bore and covers the inlet bore end. The dome member includes a plurality of apertures through the dome for restricting the flow of fluid through the dome and into the bore. The plurality of apertures split the incoming fluid stream into many smaller streams and thereby reduce the noise.

In addition, one or more apertured discs may be mounted substantially perpendicularly in the bore immediately adjacent and downstream of the dome member. After the fluid passes through the apertured dome, the fluid jet created when the ball is opened is forced to take several different paths through the openings in the apertured discs. This tortuous path provides for the further dissipation of energy stored in the fluid stream.

It is preferred that the spherically shaped dome member is mounted convex to the fluid flow stream. If desired, another spherically shaped apertured dome may be provided covering the outlet bore end. If the second dome is used, it is most conveniently mounted concave to the fluid flow stream.

This invention provides a combined full ball and noise attenuator wherein a substantial amount of noise attenuation is obtained at the fully opened valve position and the attenuation is substantially constant from the initial valve opening to fully opened.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a fragmentary cutaway view schematically illustrating a rotary ball fluid control valve containing a rotary ball member with a noise attenuator in accordance with the present invention;

FIG. 2 is a perspective view illustrating the rotary ball control member of FIG. 1;

FIG. 3 is a schematic illustration of the spherically shaped dome portion of the rotary ball member of FIG. 2 with an alternative aperture pattern;

DETAILED DESCRIPTION

Figure 4:
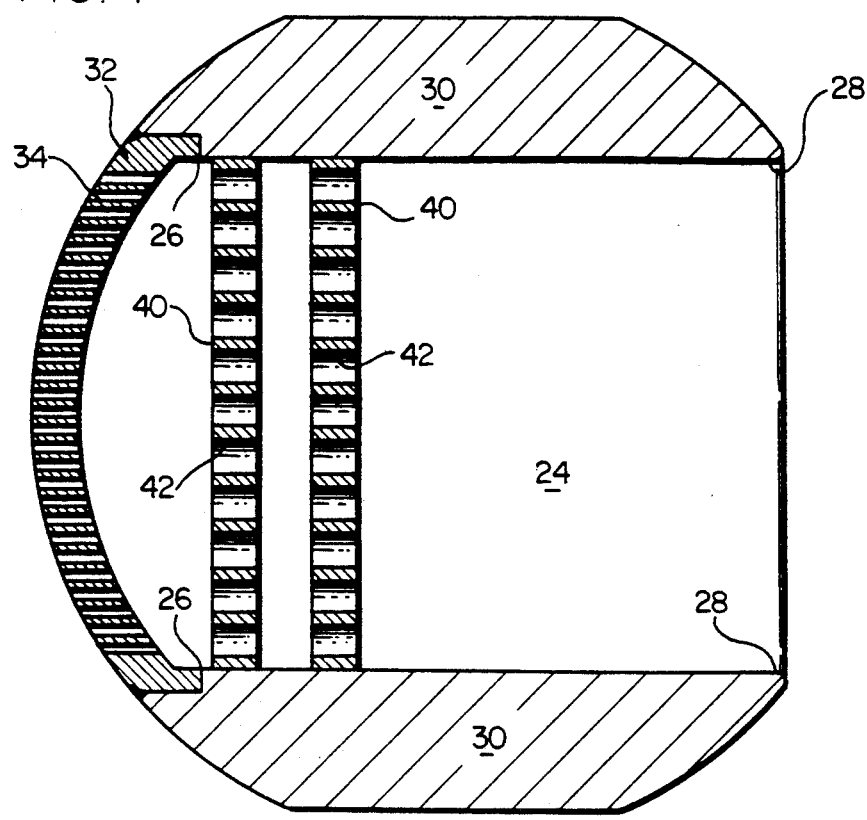
FIG. 4 is a schematic cross-sectional view of an alternative embodiment of the rotary ball control member with noise attenuator.

FIG. 1 illustrates a rotary ball fluid control valve 10 including a valve body 12 with an inlet port 14, fluid passageway 16, and outlet port 18. A rotary ball control member 20 is rotated by shaft 22 between fluid closed and opened positions with respect to a valve seat within valve body 12.

Rotary ball 20 comprises a spherically shaped ball having a bore 24 with an inlet bore end 26 for receiving the fluid stream in passageway 16 and an outlet bore end 28 from which the fluid exits the ball. As in a standard rotary ball control member, when the solid surface area 30 of the ball is seated against the valve seat, fluid is shutoff between valve outlet 14 and 18. As shaft 22 is rotated to rotate inlet bore end 26 away from the valve seat, fluid may then enter inlet bore end 26 and pass through bore 24 and exit through outlet bore end 28.

A spherically shaped dome 32 is mounted to the ball at a bore end, and particularly at inlet bore end 26 so as to cover the inlet bore. Dome 32 includes a plurality of apertures 34 so that the input fluid stream in passageway 16 encounters and must pass through apertures 34 in spherical shaped dome 32 in order to enter the bore. Thus the input fluid stream is broken up into many smaller streams passing through the apertures 34 so that the energy and therefore the noise contained within the fluid jet stream is reduced.

In instances where a low flow rate capacity is desired, the indicated aperture dome pattern shown in FIG. 2 consisting of all small diameter apertures 34 can be utilized. The rotary ball with dome 32 presents a substantial amount of noise attenuation of the fluid stream substantially constant with respect to valve position. Also, it may be noted that at the fully opened valve position the desired substantial amount of noise attenuation is achieved as the flow still must pass through the dome to enter the bore.

In instances where more flow rate capacity is needed, larger apertures, such as apertures 36 may be utilized in association with the smaller apertures 34. This larger capacity embodiment is shown for instance in the alternative embodiment of FIG. 3 which illustrates the aperture pattern of an alternative spherically shaped dome 38.

Figure 5:
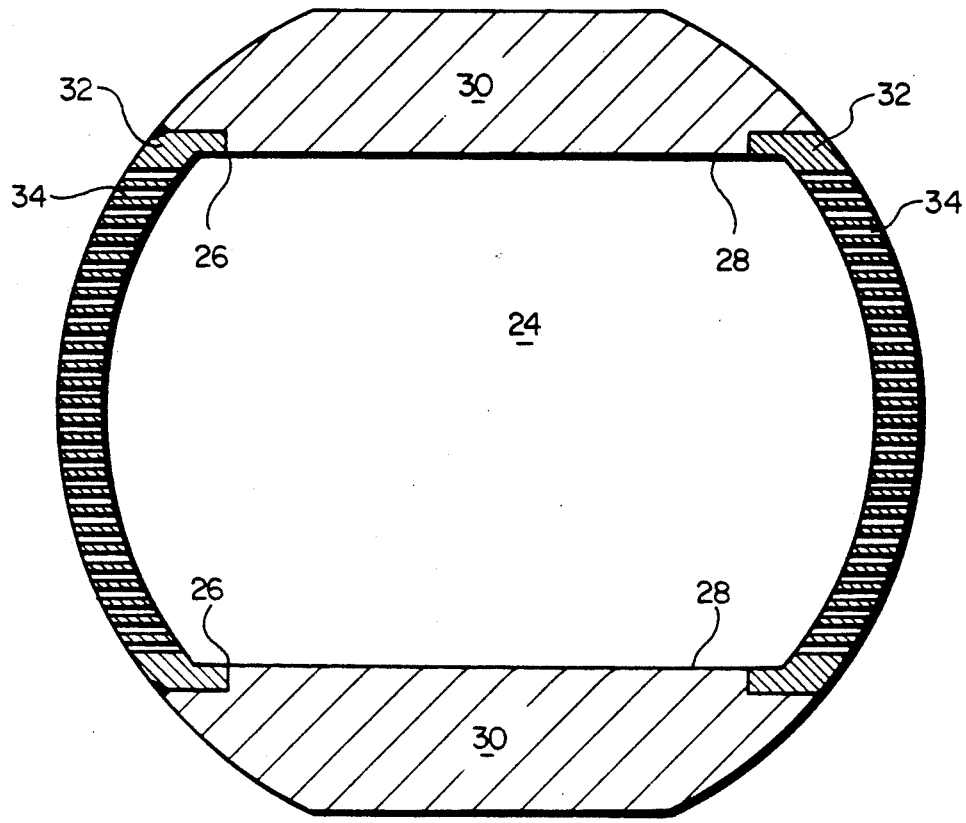
FIG. 5 is a schematic cross-sectional view of another alternative embodiment.

In an alternative embodiment of FIG. 4, within bore 24 of ball 20, there is suitably mounted a pair of discs 40 each having a plurality of apertures 42. Thus, in the alternative embodiment of FIG. 4, after the fluid stream passes through apertures 34 in spherically shaped dome 32, the fluid also must pass through apertures 42 within both of discs 40. Therefore, as the ball is opened, the fluid jet thereby created is forced to take several different paths through the apertures 42 in discs 40. This tortuous path provides for the further dissipation of energy contained in the fluid stream. Varying the number and sequence of dome 32 and aperture discs 40 can provide a wide range of desired flow capacity and noise attenuation. Also, a dome 32 can be inserted in the middle of bore 24 or at the outlet bore end 28 or in both locations, as shown in FIG. 5.

Dome 32 is mounted within a groove and welded to the ball at the inlet bore end 26. Discs 40 are mounted by welding within respective grooves in bore 24. Other suitable mounting means may of course be utilized, such as snap rings or fasteners.

The foregoing detailed description has been given for clearness of understanding only, and no unnecessary limitations should be understood therefrom, as modifications will be obvious to those skilled in the art.

I claim:

1. A rotary ball/noise attenuator for a fluid control valve controlling a fluid stream and attenuating noise in said fluid stream, said rotary ball comprising:
   a spherical ball rotatable control member;
   an elongated bore in the ball for receiving fluid at an inlet bore end and communicating the fluid to an outlet bore end;
   a spherically shaped dome mounted to said ball and covering said inlet bore end, including a plurality of apertures through said spherically shaped dome for restricting the flow of fluid through said dome and entering said bore; and
   said noise attenuation being substantially constant over the full extent of said valve operation between the initial opening to the fully opened positions.

2. A rotary ball according to claim 1, including at least one apertured disc mounted in said bore adjacent and downstream from said spherically shaped dome for splitting said fluid flow stream into many parts.

3. A rotary ball according to claim 2, including a plurality of said apertured discs.

4. A rotary ball according to claim 1, wherein said spherically shaped dome is mounted convex to said fluid flow stream.

5. A rotary ball according to claim 4, including another of said spherically shaped domes covering said outlet bore end and mounted concave to said fluid flow stream.

* * * * *